United States Patent
Bains et al.

(10) Patent No.: US 6,625,584 B1
(45) Date of Patent: Sep. 23, 2003

(54) MARITIME FREIGHT OPTION

(76) Inventors: Jatin S. Bains, 5411 Town Ct., South, Lawrenceville, NJ (US) 08645; Surinder S. Bains, 18 Natsisky Farm Rd., South Windsor, CT (US) 06074; Livingston Davies, 12 Midway Rd., Duxbury, MA (US) 02332

( * ) Notice: Subject to any disclaimer, the term of this patent is extended or adjusted under 35 U.S.C. 154(b) by 0 days.

(21) Appl. No.: 09/305,021

(22) Filed: May 4, 1999

(51) Int. Cl.[7] .............................................. G06F 17/60
(52) U.S. Cl. ..................................................... 705/400
(58) Field of Search .............................. 705/400, 5, 6; 342/41; 340/539; 700/90

(56) References Cited

U.S. PATENT DOCUMENTS

| | | | |
|---|---|---|---|
| 3,711,862 A | * 1/1973 | Story | 700/90 |
| 4,766,539 A | 8/1988 | Fox | 364/401 |
| 4,885,685 A | * 12/1989 | Wolfberg et al. | 705/14 |
| 5,203,620 A | 4/1993 | McLennan | 312/334 |
| 5,285,383 A | * 2/1994 | Lindsey et al. | 705/5 |
| 5,483,444 A | * 1/1996 | Heintzman et al. | 705/5 |
| 5,797,127 A | * 8/1998 | Walker et al. | 705/37 |

FOREIGN PATENT DOCUMENTS

KR      200117928 A   * 3/2001

OTHER PUBLICATIONS

Gooley, Toby; How to choose an ocean carrier; Here are some practical guidelines for evaluating steamship-line services; Apr. 1992; Traffic Management, v31, n4, p83A(4); Dialog copy pp. 1–4.*

* cited by examiner

Primary Examiner—Thomas A. Dixon
(74) Attorney, Agent, or Firm—Livingston Davies

(57) ABSTRACT

A maritime container booking process delivered via the Internet for pricing, routing and confirming freight bookings and associated options on ocean going container ships loading and discharging in the United States of America and ports of call worldwide. By following this program the shipper can secure freight bookings, without paying for services in advance or committing to any minimum cargo volume. Pricing of the freight will be sensitive to loading ports, discharge ports, type of equipment required, type of service required, transit time and type of commodity.

7 Claims, 6 Drawing Sheets

MARITIME FREIGHT OPTION

CROSS REFERENCE TO RELATED APPLICATIONS

Not Applicable

STATEMENT REGARDING FEDERALLY SPONSORED RESEARCH OR DEVELOPMENT

Not Applicable

SEQUENCE LISTING

Not Applicable

BACKGROUND OF THE INVENTION

The present invention relates to the field of option pricing and contracting of shipping space. Container freight rates, in the US import/export trade are highly cyclical due to the participation of foreign flag carriers with lower operating costs who are constantly setting rates, negotiating volume discounts, changing rates of container shipping space based on availability, changing rates of shipping container space often based on commodity. For example, when carriers have shortage of container space and equipment they routinely increase freight rates. Similarly they routinely lower rates when they have surplus equipment in one region of the world to reposition their container equipment; this process is routinely used to tackle container imbalance and is the container carriers' form of yield management Through Apr. 30, 1999 the Federal Maritime Commission, Washington D.C. based on the 1984 Shipping Act was responsible to ensure that the container carriers do not increase freight rates arbitrarily and without due cause. The US Government has deregulated the container ship industry, which operated within conferences since 1916 and had modified itself in 1984. Now the Ocean Shipping reform Act of 1998 will allow the carriers to negotiate privately. This shall allow shippers of large cargo volumes to enjoy advantageous freight rates by negotiating privately. The small shipper will seek to attain economies of scale by booking their container cargo through third party "Infomediaries" in order to become part of a larger buying block for lower prices, because only limited number of shippers will enjoy deeply discounted container rates. Until now there was no suitable way to minimize these drawbacks and enable the shipper to enjoy competitive freight rates without cargo volume. The shipper is requesting container space at a certain price from the platform referred to as "Maritime Freight Option" and the carrier bids on the cargo volume not knowing the cargo source. The shipper does not compromise their relationship with any carrier who may dominate particular trade and fear any form of reprisals.

Option contracts ("options"), are known in other fields as a way of locking in a particular purchase price for a given commodity. Because of this, buyers to minimize the risk of rising prices can use options. One of the most widely known types of options is the covered option to purchase stock. The issuer of this type of option owns a number of shares of a particular stock. The buyer of this type of option has the right to purchase, from the issuer of the option, a predetermined number of shares of the stock, at a predetermined price, at any time before the option expires. For example, if A owns 1000 shares of UVW stock, A can sell an option to B that gives B the right to buy A's stock for $50 per share at any time before a predetermined expiration date. If the option is exercised, the seller receives the pre-agreed purchase price in exchange for the stock. If the option expires unexercised, the seller retains the stock and can sell another option on the same stock.

Covered options are not limited to the stock market—they have been used to purchase various other commodities as well. For example, if A owns an ounce of silver, A can sell an option to B, for $0.50, which gives B the right to buy A's ounce of silver for $5. If, before the option expires, B decides that he wants to buy A's silver B exercises his option and pays A $5 for the silver. If B decides that he does not want to buy A's silver, B does nothing. Because B is not bound to buy A's silver, if the market price of silver falls below $5, B will not want to exercise his option he will buy the silver on the open market. No matter what B does, however, A retains the $0.50 purchase price of the option.

Options are often used in areas where the price of the underlying commodity (such as the stock or the silver) is volatile. The option purchaser benefits by obtaining a guarantee that he will be able to buy the commodity at a price that he can afford. The option seller benefits by receiving the purchase price of the option.

Until now, however, there has been no acceptable way to minimize the risk of fluctuations in containerized freight rates. In particular, as far as we are aware, booking options to engage container space have never been sold on an auction platform. Moreover, no systems have been developed for determining prices for options on container space, and keeping track of the sale and exercise of those booking options.

SUMMARY OF THE INVENTION

The present invention advantageously fills the aforementioned deficiency in the prior art by providing a method and program for pricing, selling, and exercising options to engage shipping container space.

The invention advantageously enables shippers, for a cost transaction fee, to lock in a guaranteed price at which they can engage container space, without financially committing themselves to irrevocably engage the container space, without accepting any responsibility for delivering minimum volume, without making any payments for the container space engaged and without putting the full tariff rate of the container space at risk in case the customer's commodity is not ready for shipment.

The invention also advantageously provides the seller with an opportunity to profit by selling options to engage shipping container space worldwide utilizing the power of the Internet to offer global shippers real-time results. The international shipping industry like the global financial markets is functioning 24 hours. When the US markets close, Asia is opening, when Asia closes, Europe is still working. The Internet is able to deliver real-time yield management to the sellers and simultaneously provide real-time price/inventory management to the advantage of the global shippers. The American industry is going global as marketplaces are consolidating, NAFTA is an example of such continued consolidation and companies such as Home Depot are entering new markets.

A shipper has diversified markets. For example, Home Depot will expand to embrace new markets and will ship containerized cargo worldwide. However, it is reasonable to assume they will be unable to safely commit substantial cargo to any one carrier. There are thousands of such shipper transactions worldwide that shall benefit from the service.

In particular, one aspect of the present invention is directed to a method of pricing options to engage container space. This method includes inputting information specifying where a customer wishes to load from and where he wishes to discharge at, type of equipment required, type of commodity required, type of service sought and at least the minimum transit time that the customer desires. A price for an option that gives the customer a right to engage container space to ship cargo from the origin to the destination within a desired time is calculated and output. The purchase price of the space engagement is one of the terms of the option.

Other aspects of the present invention are directed to a computer program and an apparatus corresponding to the method previously described and to an embodiment using a central controller and a number of agent terminals.

DETAILED DESCRIPTION OF THE INVENTION

The present invention is directed to a system for determining an appropriate price for options to engage container space, and facilitating the sale and the exercising of those options.

Traditional methods of determining prices for options on stocks and traditional commodities are not suitable in the container ship industry, due the unique nature of shipping containerized cargo to multiple destinations. To begin with, (1) the product (i.e., a container space) is only supplied by a select group of container carriers; (2) the product is not completely fungible, because certain shippers may prefer shipping on a particular carrier, or through certain loading ports predominantly served by one or two carriers; and (3) the supply of the product is small, because only a limited number of container space is available on any given voyage.

Figure 1:
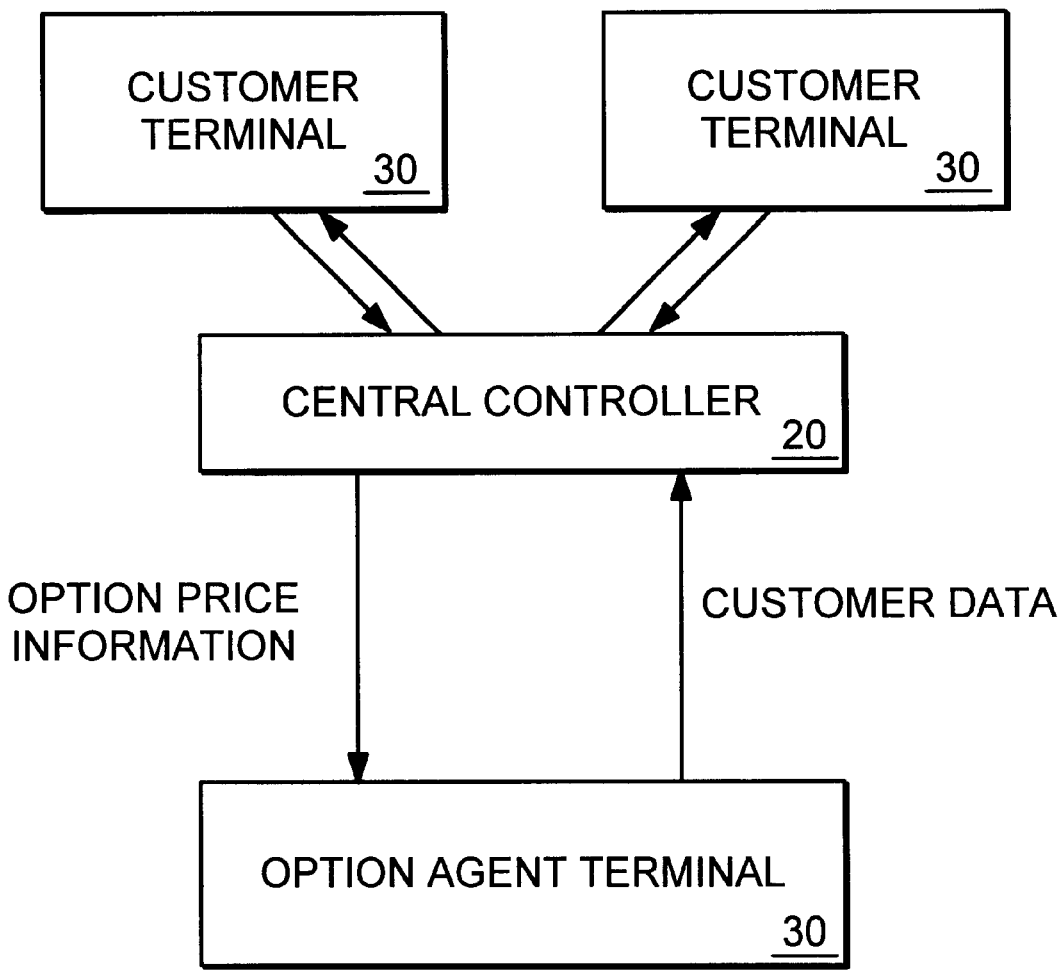
FIG. 1 is an overall system block diagram of a preferred embodiment of the present invention.

FIG. 1 is an overall system block diagram of a preferred embodiment of the present invention. In this embodiment, a central controller 20 is linked up to at least one agent terminal 30. Three agent terminals are depicted in FIG. 1, but any number of agent terminals can be used. The link between the agent terminal 30 and the central controller 20 does not have to be a physical link. It can, for example, be a link via modem, as described in the subsequent description, or any other link. An option transaction can be initiated from any one of the agent terminals 30. The information required to implement the transaction is passed between the agent terminal 30 and the central controller 20, until the transaction is complete. The central controller keeps track of all transactions, including option transactions, in the system.

The system depicted in FIG. 1 may be embodied in hardware specifically provided to implement the present invention. Alternatively, the system may be implemented using the infrastructure that already links the customers to the agents. The hardware and communication links of existing Internet or other systems may be used as an infrastructure for the present invention. Changes to the existing central controllers to incorporate the subject invention may be accomplished in various ways such as by reprogramming an existing file server or by adding an additional file server (with or without a CPU dedicated to option transactions). Alternatively, the subject invention may be implemented using existing hardware entirely, making appropriate software updates.

Figure 2:
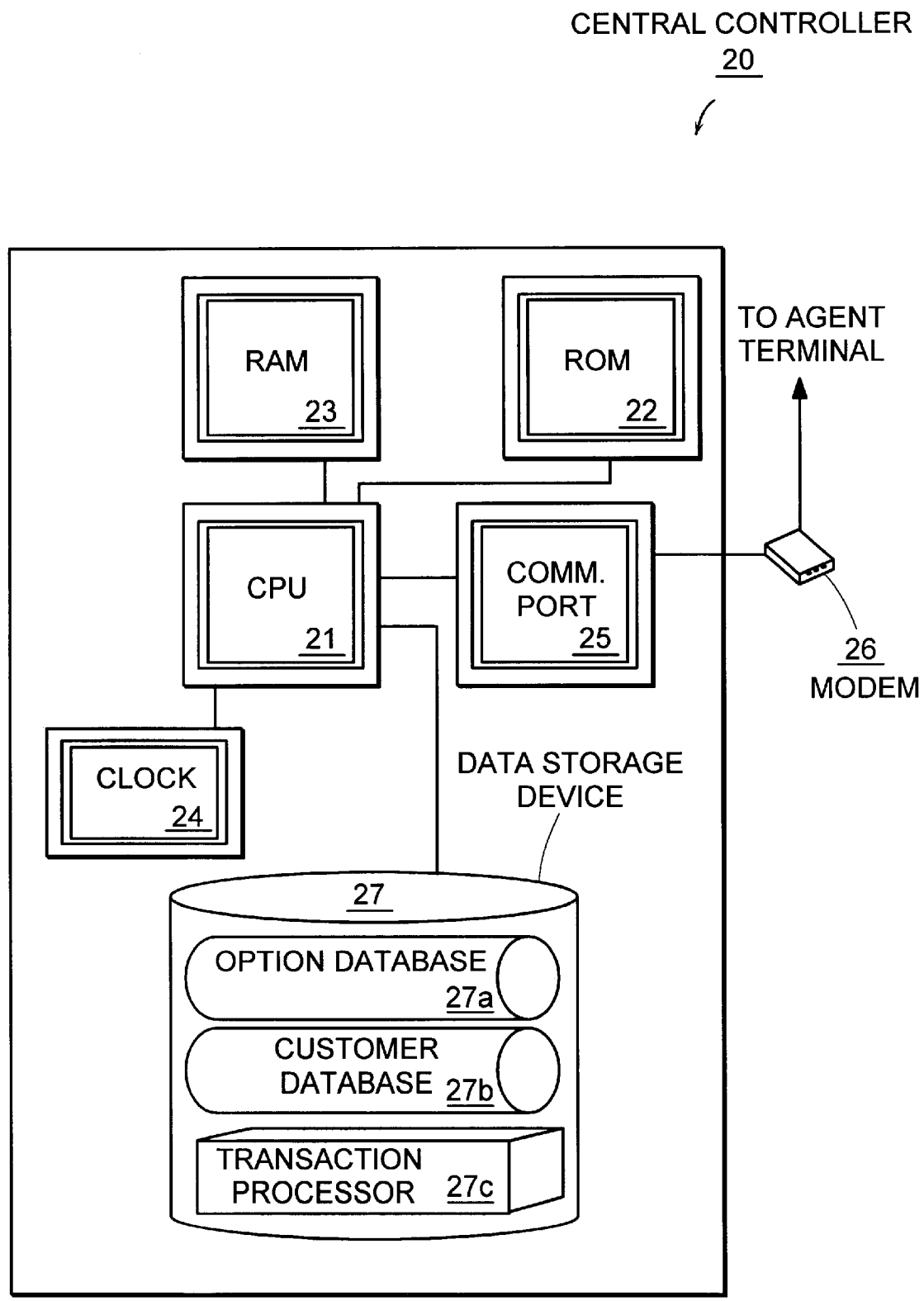
FIG. 2 is a block diagram of the central controller.

FIG. 2 is a block diagram of a preferred central controller 20. The central controller includes a CPU 21, which performs the processing functions of the controller. It also includes a read only memory 22 (ROM) and a random access memory 23 (RAM). The ROM 22 is used to store at least some of the program instructions that are to be executed by the CPU 21, such as portions of the operating system or BIOS, and the RAM 23 is used for temporary storage of data. A clock circuit 24 provides a clock signal, which is required by the CPU. The use of a CPU in conjunction with ROM, RAM, and a clock circuit is well known to those skilled in the art of CPU based electronic circuit design.

The central controller 20 also includes a communication port 25, which enables the CPU 21 to communicate with device external to the central controller 20. In particular, the communication port 25 facilitates communication between the modem 26 and the CPU 21, so that information arriving from the modem 26 can be processed by the CPU 21, and the CPU 21 can send information to remote locations via the modem 26.

While the illustrated embodiment uses a modem 26 to communicate with devices outside the central controller 20, it should be understood that other methods of communicating with external devices may be used instead of a modem. These other methods include hard-wired connections, radio communications, optical communications, and the like.

The CPU 21 can also store information to, and read information from, the data storage device 27. This data storage device 27 includes an option database 27a and a customer database 27b, which are described below. In addition, it includes transaction processor instructions 27c which can be read by and executed by the CPU 21, thereby enabling the CPU 21 to process transactions. While FIG. 2 depicts separate option and customer databases, a single database that incorporates both of those functions can also be used.

Figure 3:
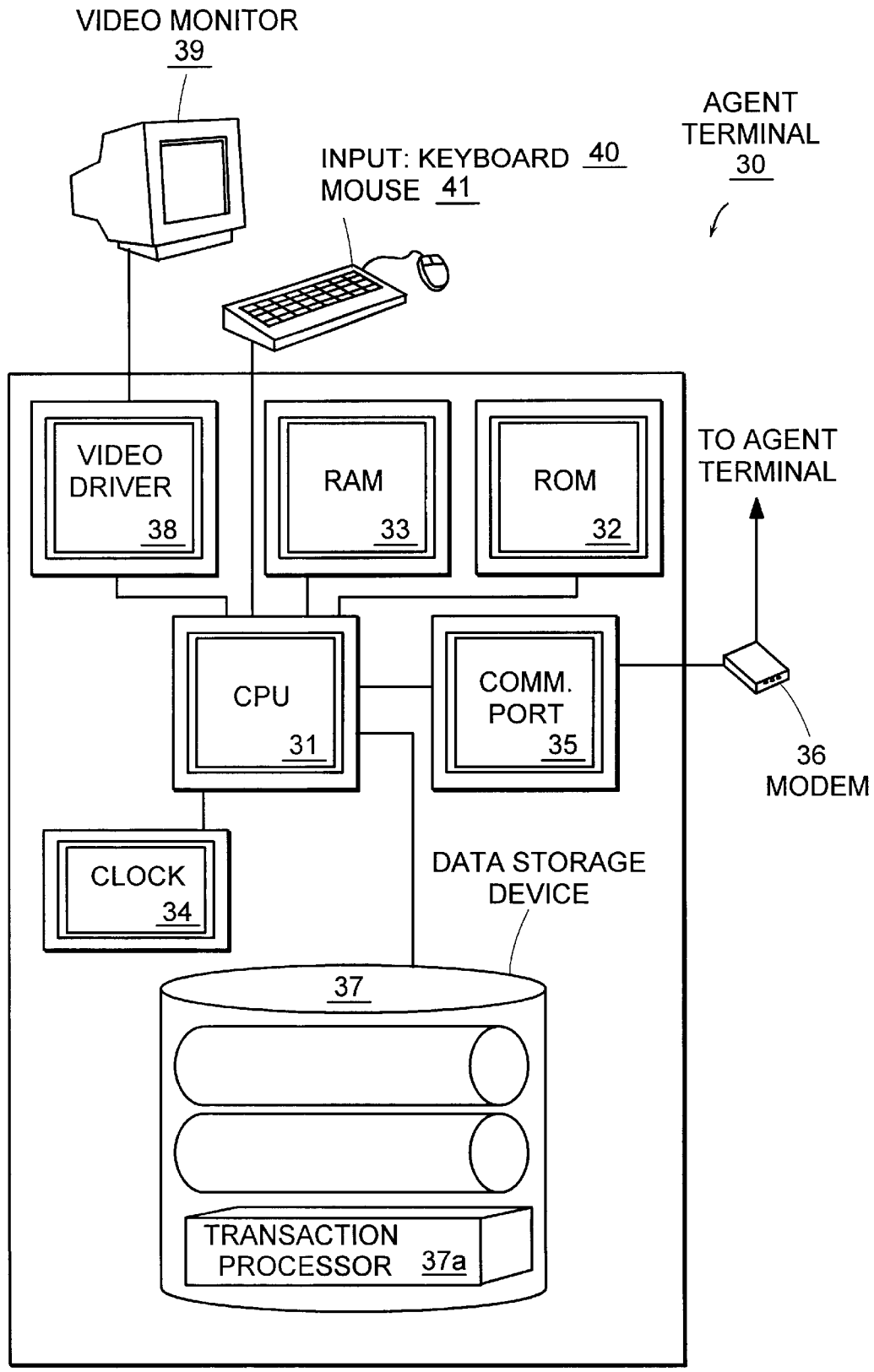
FIG. 3 is a block diagram of the agent terminal.

FIG. 3 is a block diagram of a preferred agent terminal 30, which can be located at a shippers warehouse, a custom agents office, a shipping desk or office (located at or distant from a port), a membership service provider or a private home, by way of example. As discussed above, there can be any number of agent terminals 30 linked up to one central controller 20. Like the central controller 20 described above, the agent terminal 30 includes a CPU 31, ROM 32, RAM 33, and a clock circuit 34. The agent terminal 30 also includes a communication port 35 which interfaces with a modem 36 that facilitates communication between the agent terminal 30 and the central controller 20. Of course, instead of the modem 36 depicted in the figure, other ways of communicating can be used, as described above for the central controller 20. A standard computer, such as an IBM PC or an Apple Macintosh, running appropriate custom-designed software, may be used as the agent terminal. Existing terminals may also be used, Alternatively, a dedicated, stand-alone agent terminal may be used.

The agent terminal 30 also includes an input device 40 to receive input from an operator. Any of a wide variety of input devices would be suitable for this purpose, including, for example, keyboards, mouse, touchscreens, and the like. The input device 40 may interface directly with the CPU 31, as shown in the figure. Alternatively, an appropriate interface circuit may be placed between the CPU 31 and the input device 40.

The agent terminal 30 also includes a video monitor 39 for conveying information to the operator. While the most preferred video monitor 39 is a CRT, other video display devices, including LCD, LED, and thin film transistor panels, may be used as well. Individual indicators may also be used to convey information to the operator, including, incandescent and neon lamps, LED's, and the like. A video driver 38 interfaces the CPU 31 to the video monitor 39 (or to any other type of video display device).

The agent terminal 30 also includes a data storage device 37, in which transaction processor instructions 37a are stored. These instructions can be read by and executed by the CPU 31, thereby enabling the CPU 31 to process transactions.

Figure 4:
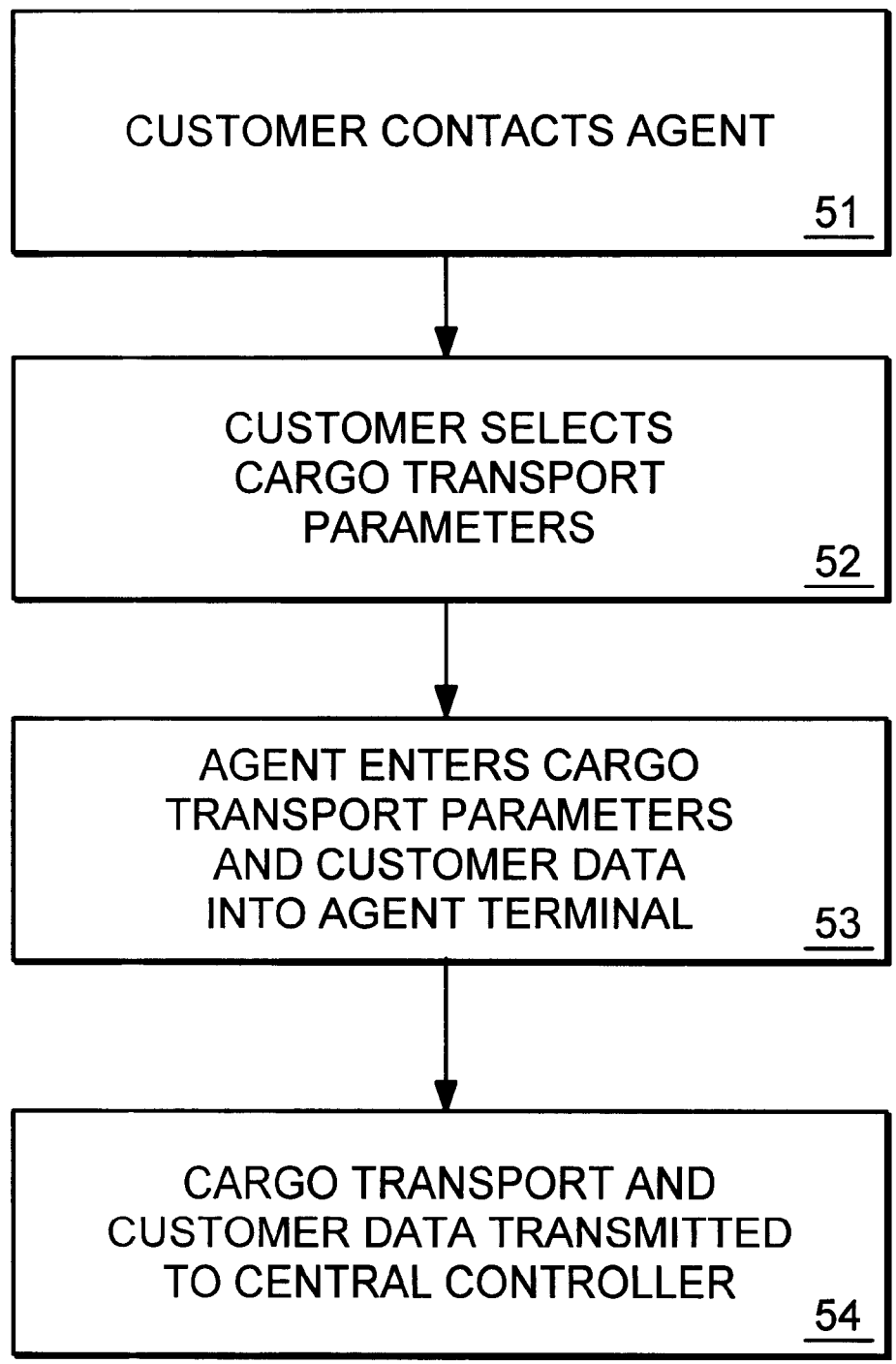
FIG. 4 is a flow chart depicting initiation of a transaction in the agent terminal.

FIG. 4 is a flow chart depicting the initiation of a transaction using an agent terminal 30. The steps of the process shown in FIG. 4 may be implemented in a computer program that may be installed at the agent terminal from, for example, a computer readable medium (such as floppy disks or CD-ROMS) which is then stored in a memory, in this case the data storage device 37 (shown in FIG. 3). Alternatively, although not so described below, the computer program may be installed at the central controller 20 from a computer readable medium and then stored therein in one or more of ROM memory 22, RAM memory 23 and data storage device 27, for access and use by agent terminals as required.

The process starts when a customer contacts shipping agent in step S1. The customer selects the cargo transport information in step S2.

This information comprises six components: load port criteria, discharge port criteria, transit time criteria, equipment criteria, service criteria and commodity criteria. The load port criteria define the set of ports from which the customer is willing to send his shipment. This set may consist of a single port, or it may consist of a plurality of ports. For example, for a customer shipping out of New York City who insists on shipping out of Port Elizabeth, N.J., the set would include only Port Elizabeth. For a second customer who is more flexible, the set would include all facilities in the Port of New York area. Similarly, the discharge port criteria determines the set of ports to which the customer is willing to send material. The transit time criteria determines the voyage to be estimated via the Panama Canal or the Suez Canal or a combination of rail and ocean freight such as New York to Osaka can be shipped by the carrier by sea via Panama Canal or by sea via Suez canal or via Conrail to Seattle then further by ship this criteria will determine time sensitive cargoes such as garments versus cost sensitive cargoes such as woodpulp. The equipment criteria determine the type of container requested. Please refer to the classification list of Container types utilized on international routes.

| | |
|---|---|
| TEU | Twenty Foot Equivalent Unit |
| FEU | Forty Foot Equivalent Unit |
| Domestic | 48 ft and 53 ft specialized high cube containers for volume cargoes. |
| High Cube | Specialized containers with extra ceiling height for garment trade. |
| Flat Rack | Specialized container with floor and corner posts only |
| Open Top | Specialized Container with no roof, (Tarpaulin used to cover cargo) |
| Composite | Specialized composite containers which are lightweight |
| Reefer | Specialized container with insulation and refrigeration plant. |
| Tank | IMO 1 specialized container, steam heated, insulated |
| Tank | IMO 1 specialized container, electrically heated |
| Tank | IMO 2 specialized container, steam heated, insulated |

STANDARD CONTAINER SPECIFICATIONS: Twenty Foot, Dimensions in mm and feet, All containers are designed for resistance to damage and corrosion. ISO dimensions followed throughout. Forklift pockets provided on 20' units to minimize handling damage. Floor forklift test to 7,260 kg (16,000 lbs.)

| | | |
|---|---|---|
| Internal Length | 5897 mm | 19 feet |
| Width | 2350 mm | 7 feet |
| Height | 2392 mm | 7 feet |
| Door Opening Width | 2341 mm | 7 feet |
| Height | 2277 mm | 7 feet |
| Allowable stacking weight on bottom box: | 192,000 kgs | 423,283 lbs |
| Weights Tare | 2250 kg | 4960 lbs |
| Max gross | 30480 kg | 67200 lbs |
| Cubic capacity | 33.1 m$^3$ | 1170 cu ft |

The service criteria determines if the shipper seeks a door to door service which shall include trucking or a pier to pier service or an inland delivery such as cargo shipped from Hartford to Beijing (both inland points) such parameters shall guide price sensitivity and Finally the commodity criteria determines the value premium on the cargo so a container of fragile electronics (of greater commercial value) has greater price sensitivity than a container of cotton.

Either the customer enters the cargo transport information, or an agent, into the agent terminal 30 in step S3. Customer data such as the customer's name, address, and telephone number, must also be entered into the agent terminal 30 in step S3. The transport information and the customer data are then transmitted to the central controller 20 in step S4.

Returning to FIG. 3, each of the steps S1–S4 described above are executed by the CPU 31 which is executing transaction processor instructions 37a stored in the data storage device 37. The communication with the central controller 20 takes place via the communication port 35 and the modem 36. The cargo transport information (and customer data) from the agent terminal 30 is received by the central controller 20.

Figure 5:
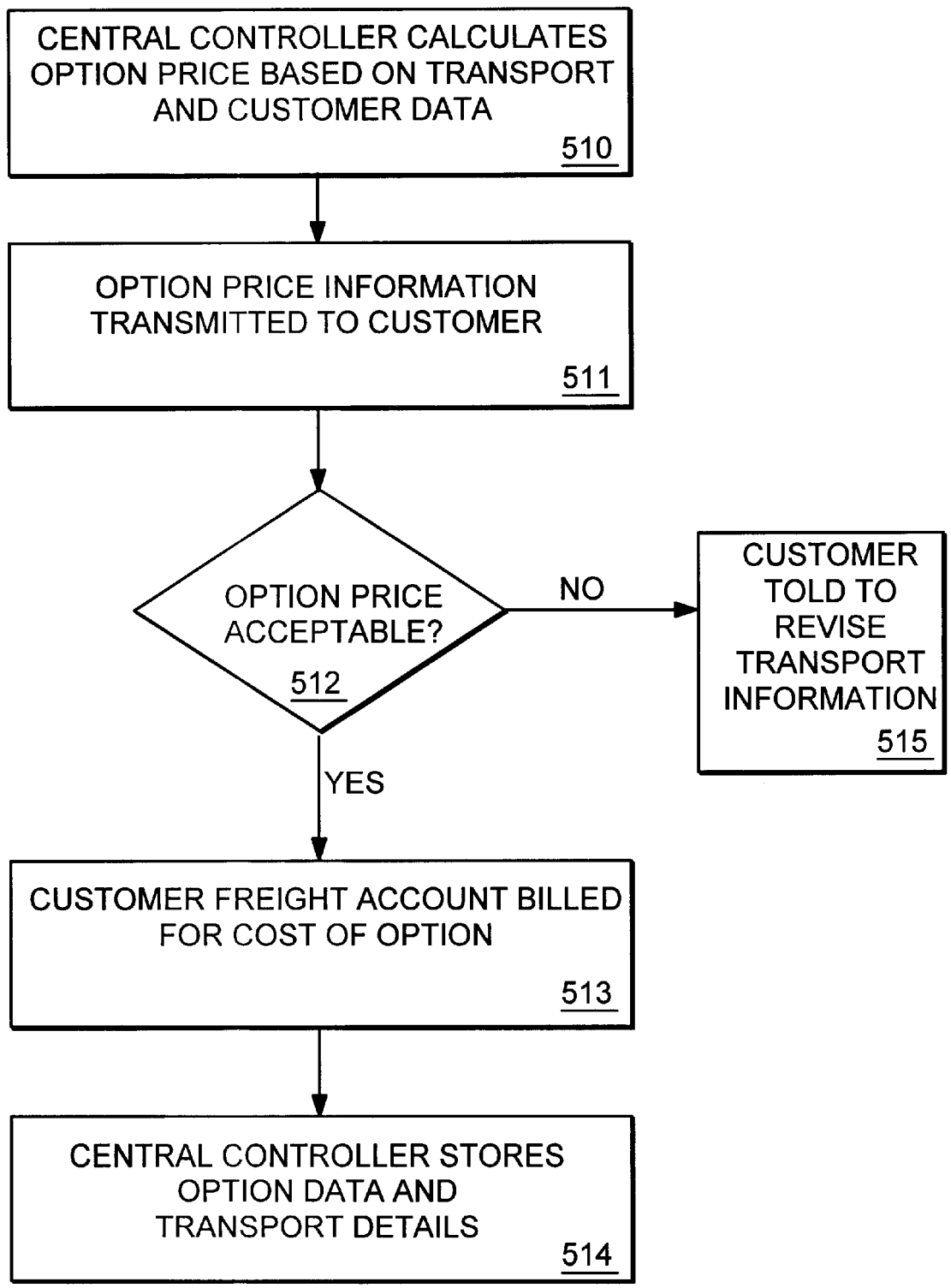
FIG. 5 is a flow chart depicting the operation of the central controller and the final phase of operation of the agent terminal.

FIG. 5 is a flowchart of the operation of the central controller 20 after receipt of cargo transport information from the agent terminal 30. The steps of the process shown in FIG. 5 may be implemented in a computer program that may be installed at the central controller 20 from a computer readable medium and then stored therein in one or more of the ROM 22, the RAM 23, and the data storage device 27 (shown in FIG. 2) The central controller 20 calculates the price of an option in step S10 based on the cargo transport information received from the agent terminal together with information from the option database 27a.

When the cargo transport information includes multiple legs, the price of the option may be simply the lowest price selected from a set of individual options on each of the legs, which the customer may ultimately use. Alternatively, that price can be discounted below that level by a predetermined percentage depending on the amount of material being shipped as included in the cargo transport information. A more sophisticated model could determine the probability of a container on any one of a given number of voyages, and compute the price of the option accordingly.

The calculation of the option price may be determined by multiplying a base option price by those factors that will affect the value of the option. The base option price may be a fraction (in this example called F, the Standard Option Factor) of the cargo shipment price for which the option is being purchased. In this example F is set at 10%. Generally, the fraction will decrease as the shipment price for which the option is being purchased approaches the full historic rate price. The variables used to calculate the option price from the base option price might be continuously or discretely variable. One combination of suitable discretely varied variables along with select continuous variables is described in the following table, which assumes the option base price is 10% of the full shipment price.

| Variable Name and Description | Sub-Category | Value Range | Example Value |
|---|---|---|---|
| O: Ocean Rate | Std 35 day voyage | $1000 | $1000 |
|  | Premium 21 day | $1400 |  |
| F: Standard Option Factor |  | continuous | 10% |
| C: Commodity type - E.g. paper products, electronics, finished plastic goods, etc. | Type 1 | 0.8 | 1.2 |
|  | Type 2 | 1.0 |  |
|  | Type 3 | 1.2 |  |
| V: Volatility - Factor related to the historic volatility of containerized cargo prices serving the relevant market as well as current general market conditions. Among other things, volatility is a function of historic price variability, contracts of affreightment, flexibility of customer need in ship date, container repositioning, and bunker surcharges (sigma) | sigma 1.0 | 0.8 | 1.0 |
|  | sigma 2.0 | 1.0 |  |
|  | sigma 3.0 | 2.0 |  |
| E: Equipment type - Type of container equipment used in the handling and transport of cargo. | 20 ft Standard | 1.0 | 1.0 |
|  | 40 ft Standard | 1.8 |  |
|  | 20 ft Refrigerated | 2.1 |  |
| S: Service category - Premium or discount associated with particular ports as well as for general categories of customer needs | Type 1 | 1.0 | 1.0 |
|  | Type 2 | 1.5 |  |

Using these variables, a sample suitable algorithm for calculating an appropriate option price is as follows:

Option Price=O. times F. times C. times V. times E. times S

While this equation uses a simple product of all of the aforementioned parameters, more sophisticated formulas may be used to arrive at a suitable option price. Once the option price information has been calculated, it is transmitted to the customer in step S11. This option price information may be a single price for an option to buy, for a particular price, a container space engagement that matches the customer's shipment information.

As an example, assume a customer wants to purchase an option to buy the standard $1000 container space. Further assume that the ship date is 30 days out, a medium load factor is expected, it is a prequalified customer, he has 48 hours of flexibility, and the shipment's standard deviation of historic price volatility is 2. The base option price is, in this example, $1000.times.10%=$100, and the final option price is $120, calculated as follows:

Option Price=$1000(O) times %10(F) times 1.2(C) times 1.0(V) times 1.0(E) times 1.0(S)

After the price information is transmitted to the customer in step S11, the customer decides whether to purchase the option in step S12. If he decides to purchase the option, the system can process the sale by billing the customer's freight account (established previously), in step S13. Of course, alternate methods of payment may be used instead of a freight bill, including payment by electronic check debit, debit a preestablished credit line, freight payable at destination, cash accompanied with a large currency transaction form, Fedwire, Pre-authorized auto debit, Cashiers check, and the like. Alternatively, the shipping company may simply invoice the customer for the price of the option to be paid in full prior to issuance of a clean on board Freight Prepaid bill of lading.

If the customer decides not to purchase an option during step S12, the customer is given a chance to revise the cargo transport information in step S15. By adding more flexibility to their shipment, the customer may be able to find an option that is suitably priced. After the shipment information is revised, the new shipment information is processed by the system in the same way as the original shipment information in order to generate a new option price. The freight payment transaction may be carried out by the central controller 20. Alternatively, the freight payment transaction may be carried out by the agent terminal 30.

Transactions processed through the agent terminal 30 may be carried out using the same modem 36 that is used to communicate with the central controller 20. Alternatively, an additional modem (not shown) may be included in the agent terminal 30 to process the credit card transactions when subject facility is available to the customer via American Express freight account.

After the sale is completed, the option database (27a in FIG. 2) is updated in step S14 to reflect the fact that a particular option has been sold. The number of options sold for a particular voyage may be used by the system as a factor in determining the price of options to be sold in the future. More specifically, when the number of options outstanding for a given voyage rises, the price for subsequent purchase of similar options may be raised to compensate the shipping company's for the additional risk of having to sell a large number of containers for a particular voyage. The customer database (27b in FIG. 2) may also be updated to indicate that a particular customer has purchased a given option. This customer database may be used for various purposes including billing and marketing.

Figure 6:
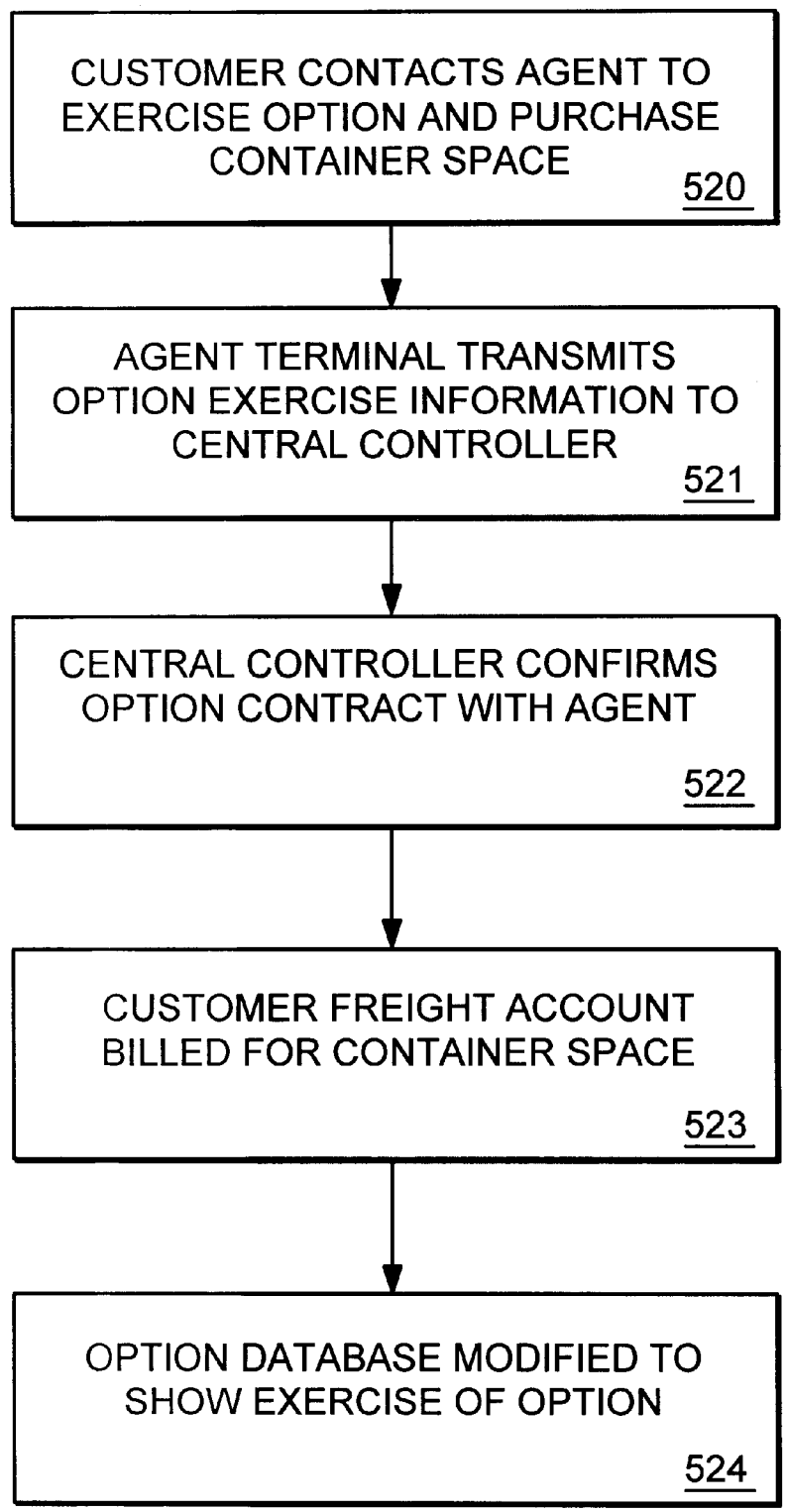
FIG. 6 is a flow chart depicting the operation of the system when an option is exercised.

FIG. 6 is a block diagram depicting operation of the system when a customer exercises an option. The steps of this process may be stored on a computer readable medium which in this case would be the data storage devices 27 and 37 (shown in FIGS. 2 and 3) First, in step S20, the customer contacts the agent and indicates that he wishes to exercise a previously purchased option and engage a container space. After the operator of the agent terminal 30 enters information describing the option, the agent terminal 30 transmits the option exercise information to the central controller 20 in step S21. The central controller 20 then confirms that the option contract does in fact exist, and is current, as shown in step S22. The customer's freight account (preestablished) is then billed for the container space specified by the option being exercised in step S23. The specifics of charging the customer for the container space are similar to the specifics of charging him for the original purchase of the option. The option database 27a in the central controller 20 (shown in FIG. 2) is subsequently updated to show that the option has been exercised, as shown in step S24.

While the above description contemplates the sale of an option with a fixed expiration date at a particular price, alternative-pricing configurations may also be used. These could include, for example, options that can be extended each month for a monthly fee. Part or the entire option price may also be credited towards the container space. After an option is issued by an shipping company, the shipping company can reserve a container on a shipment covered by the option, and cancel the booking when the option expires.

Alternatively, the shipping company can do nothing until the option is exercised, and at that point reserve the customer on a shipment that matches the specified cargo transport criteria If this reservation results in overbooking of the shipment, the shipping company can resort to traditional methods of dealing with overbooking, such as compensating customers that miss the shipment. Alternatively, the shipper can add an extra shipment to provide the customer with the desired service.

The description above contemplates the use of options that are issued by the shipping companies themselves, which are capable of issuing the appropriate container space when the option is exercised. It should be recognized, however, that the option need not be issued by the shipping company's themselves. A third party can issue the option, provided that the third party is willing to go out into the market and purchase container space if and when the option is exercised. This latter situation corresponds to a party that does not own shares of a given stock selling "naked" options on that stock.

In an alternative embodiment, the option may be replaced by an insurance policy that insures the policyholder that he would be able to buy a container space at a given price. The policy would indemnify the policyholder against part or all of the additional prices that he might need to pay to buy the ticket. Pricing the insurance policy would be similar to pricing the options described above, and selling the policy could also be similar to selling the options described above.

While the present invention has been described above in terms of specific embodiments, it is to be understood that the invention is not limited to the disclosed embodiments. On the contrary, the present invention is intended to cover various modifications and equivalent structures included within the spirit and scope of the appended claims.

What is claimed is:

1. A data processing machine for determining a freight rate to engage a container space, comprising a CPU and a memory operatively connected to said CPU, said memory containing a program adapted to be executed by said CPU and said CPU and memory cooperatively adapted to receive container pricing information, to calculate a price of shipment of a container, to engage such shipment within a future period, for a particular freight rate, satisfying the cargo transport information submitted, wherein said program in said memory is adapted to receive an indication that a customer has engaged a container space and is further adapted to update a database to reflect a unique container carrier booking.

2. A data processing machine for determining a freight rate to engage a container space, comprising a CPU and a memory operatively connected to said CPU, said memory containing a program adapted to be executed by said CPU and said CPU and memory cooperatively adapted to receive container pricing information, to calculate a price of shipment of a container, to engage such shipment within a future period, for a particular freight rate, satisfying the cargo transport information submitted, wherein said program in said memory is adapted to calculate the container price based at least in part on the number of similar container bookings confirmed, using information stored in an option database.

3. A data processing machine for determining a freight rate to engage a container space, comprising
a CPU and a memory operatively connected to said CPU, said memory containing a program adapted to be executed by said CPU and said CPU and memory cooperatively adapted to receive container pricing information and cargo transport information, and to calculate a price of shipment of a container to engage such shipment within a future period, for a particular freight rate, satisfying the cargo transport information;
wherein said program in said memory is adapted to calculate the freight rate based at least in part on the formula: Freight Rate=O times F times C times V times E times S where O is a ocean freight rate for the container, F is a standard option factor, C is a factor related to the commodity type, V is a factor related to volatility, E is a factor related to the equipment type and S is a factor related to service category.

4. A method of determining the price of a container shipment, comprising the steps of:
receiving cargo transport parameters relative to the future booking of a container;
calculating a price for a container booking within a defined shipping period for a particular price, a container shipment satisfying the cargo transport parameters;
receiving at least one of first information describing a desired category of service, second information concerning expected cargo volume on voyages that satisfy a load port criteria and a transit time criteria, and third information concerning cyclical nature of container prices,
and wherein said calculating step further includes utilizing at least one of said first information, said second information, and said third information to calculate the option price,
outputting said price.

5. A data processing computer for selling an option to engage container space, comprising:
A terminal adapted to communicate with a central controller that calculates a price of an option to engage a container space within a shipping period, for a particular container price, wherein said terminal is adapted to transmit to the central controller option pricing information comprising load port terminal, discharge port criteria and transit time and routing criteria, service category criteria, commodity type criteria, container equipment criteria and further adapted to receive from the central controller a price of an option satisfying the load port terminal criteria, discharge port criteria, transit time and routing criteria, service category criteria, commodity type criteria and container equipment criteria.

6. The computer according to claim 5, wherein said terminal is adapted to transmit a customer request to purchase the option and further adapted to perform a shipping engagement utilizing a booking note in order to book containerized freight in accordance with a container carrier's bills of lading, terms and conditions and said computer is adapted to transmit such option to a customer.

7. The computer according to claim 5, wherein said terminal is adapted to transmit a customer request to exercise an option and further adapted to confirm a booking note in accordance with said pricing information.

* * * * *